March 4, 1958

L. P. DOSMANN 2,825,661

METHOD OF COATING THERMOPLASTIC MATERIAL
AND ARTICLE PRODUCED THEREBY

Filed Sept. 10, 1954

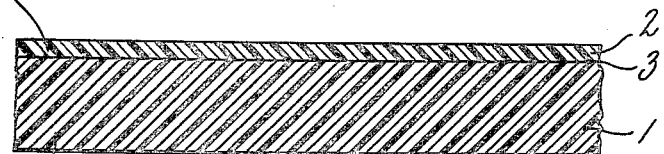

VINYL CHLORIDE-TRIFLUOROCHLOROETHYLENE RESINOUS COPOLYMER

BLEND OF STYRENE-ACRYLONITRILE RESINOUS COPOLYMER AND BUTADIENE-ACRYLONITRILE RUBBERY COPOLYMER OR OF STYRENE-BUTADIENE RESINOUS COPOLYMER AND BUTADIENE-STYRENE RUBBERY COPOLYMER

INVENTOR.
LUCIAN P. DOSMANN
BY
Robert J. Patterson
ATTORNEY

United States Patent Office 2,825,661
Patented Mar. 4, 1958

2,825,661

METHOD OF COATING THERMOPLASTIC MATERIAL AND ARTICLE PRODUCED THEREBY

Lucian P. Dosmann, South Bend, Ind., assignor to United States Rubber Company, New York, N. Y., a corporation of New Jersey Application September 10, 1954, Serial No. 455,182

9 Claims. (Cl. 117—138.8)

This invention relates to a method of providing a protective and decorative coating on a normally hard, tough, thermoplastic base material, the principal components of which are a styrene-acrylonitrile resinous copolymer and a butadiene-acrylonitrile rubbery copolymer in uniform homogeneous admixture with one another or a styrene-butadiene resinous copolymer and a butadiene-styrene rubbery copolymer in like admixture with one another, and to the resulting article of manufacture.

A plastic material which has attained considerable importance is a normally hard, tough, thermoplastic material composed essentially of a uniform thermoplastic mixture of from 60 to 90% of a resinous copolymer of styrene and acrylonitrile in proportions of from 50 to 90% of styrene, and from 50 to 10% of acrylonitrile, and from 40 to 10% of a rubbery copolymer of butadiene and acrylonitrile, i. e., the material commonly referred to as Buna N, which usually will be a copolymer of from 15 to 40% of acrylonitrile and from 85 to 60% of butadiene and often will contain from 40 to 100% of methyl ethyl ketone-insoluble gel, which may be imparted in the way described in Romeyn et al. U. S. Patent No. 2,597,951. Small amounts of pigments (which term I use to include fillers) may be included in the mixture. For further details regarding normally hard, tough, thermoplastic mixtures of styrene-acrylonitrile resinous copolymers and butadiene-acrylonitrile rubbery copolymers attention is directed to U. S. Patents Nos. 2,439,202, 2,505,349 and 2,550,139 to L. E. Daly and No. 2,600,024 to Romeyn et al. The proportions of the resinous and rubbery copolymers are by weight based on the sum of the two copolymers.

Another plastic material which has also attained importance is a normally hard, tough, thermoplastic material composed essentially of a similar mixture of from 60 to 90% of a resinous copolymer of styrene and butadiene, which typically is a copolymer of from 75 to 95% of styrene and from 25 to 5% of butadiene, and from 40 to 10% of a rubbery copolymer of butadiene and styrene, which typically is a copolymer of a major proportion of butadiene and a minor proportion of styrene, this component being commonly known as GR–S. These blends may or may not be vulcanized in the final sheet or shaped article. It is often preferable that they be unvulcanized so that scrap sheet or molded articles can be re-worked into new sheets or molded articles.

The plastic materials mentioned above are often sold in the form of sheets, typically having a thickness of from $\frac{1}{16}$ to $\frac{1}{4}$ of an inch, these sheets often being made by plying up under heat and pressure a plurality of layers of thin calendered sheets of the base stock. Articles of varying shapes are made from these sheets by drawing in the known manner. In some cases the aforementioned mixtures of resinous and rubbery copolymers are supplied in the form of granular molding powders which are often molded by conventional techniques to form articles having the desired shape.

The problem has arisen of providing a decorative and protective coating for sheets or shaped articles made of normally hard, tough blends of the aforementioned resinous and rubbery copolymers. Heretofore, in order to provide the customer with a sheet or molded article having the desired color it was necessary to compound an undesirably large number of differently colored stocks of the resin-rubber mixture. It has been recognized that, if it were commercially feasible to do so, it would be desirable to make sheets or articles of stocks of only a relatively small number of basic colors, say about 10, and to provide a lacquer which could be applied to the finished sheet or drawn article or molded body to give the additional colors desired. The properties required of such a lacquer are that it adhere tenaciously to the resin-rubber blend and that it stand up well upon prolonged exposure to the weather. Heretofore no lacquer having these properties was known to those confronted with the problem.

Another problem encountered with articles of the aforementioned resin-rubber blends is that when they are used outdoors the action of the elements causes a phase separation on the surface. Apparently outdoor exposure changes the rubber or resin or both in such a way that they become incompatible and actually form separate phases. This phase separation is highly objectionable because of the unattractiveness of the surface of the article which has undergone it.

Attempts have been made to overcome the aforementioned difficulties by coating the surface of the sheet or article with a pigmented coating composition. However, the generally available lacquers and coating compositions have been wholly unsatisfactory for this purpose. The ordinary lacquers do not prevent or cover up the phase separation and they deteriorate or darken objectionably upon outdoor exposure. In addition, normal lacquers chip off the coated body under ordinary conditions of handling and use and this of course is highly objectionable.

The principal object of the present invention is to provide an improved coating for sheets or articles formed of normally hard, tough, thermoplastic mixtures of a styrene-acrylonitrile resinous copolymer and a butadiene-acrylonitrile rubbery copolymer or of a styrene-butadiene resinous copolymer and a butadiene-styrene rubbery copolymer. Another object is to provide a coating which can be easily applied by ordinary coating techniques, which prevents the above-mentioned phase separation, which provides a highly attractive surface finish, which enables the manufacture of the underlying sheet or body in only a relatively small number of basic colors and yet enables the manufacturer to readily provide an article having any desired color, which provides a coating which is permanently attractive even under conditions of outdoor exposure, and which tenaciously adheres to the underlying resin-rubber body. Another object is to provide a coating which promotes superior outdoor aging of these rubber-resin blends, and which protects the surface of such blends against bloom, surface erosion, water spotting and discoloration over prolonged outdoor aging, for a period of say one year, in Florida. Numerous other objects of the present invention will more fully hereinafter appear.

In the accompanying drawing there is portrayed diagrammatically a section of thermoplastic base sheet 1 of a rubber-resin blend having an overlying surface coating 2 in accordance with the present invention. Reference numeral 3 represents the interface between the thermoplastic base sheet and the overlying surface coating.

The present invention is based upon my discovery that the foregoing objects can be accomplished in a simple and commercially feasible manner by providing on the surface of the thermoplastic base sheet or molded body of a normally hard, tough uniform mixture of the kind indicated above, a continuous layer of a composition comprising a resinous copolymer of vinyl chloride and trifluorochloroethylene.

In practicing my invention I apply to the surface of the body of resin-rubber blend a lacquer comprising a clear or a pigmented solution of the resinous copolymer of vinyl chloride and trifluorochloroethylene in a volatile organic solvent therefor, and to evaporate the solvent to deposit a continuous layer of vinyl chloride-trifluorochloroethylene resinous copolymer on the surface. Only a single application of the lacquer, resulting in a very thin layer of the resinous copolymer, will suffice for some purposes, but for best results, especially when the coated article is to be used in contact with hot water, I apply several coats.

I find that especially good results are obtained if the lacquer used in the first coat at least, and preferably in all coats in the interest of simplicity, is made by dissolving the vinyl chloride-trfluorochloroethylene resinous copolymer in a solvent composed of a major proportion of an organic liquid which is substantially a non-solvent for (i. e. exerts substantially no solvent or swelling action upon) the rubbery and resin components of the base material and a minor proportion of an organic liquid which is a good solvent for at least one, and preferably both, of the resin and rubber components of the base material. The proportion of the latter ingredient in the solvent should be sufficiently great to cause the mixed lacquer solvent to attack the base but not so great as to objectionably impair the properties of the surface of the base. I have found that use of such a mixed solvent gives remarkably good adhesion of the pigmented vinyl chloride-trifluorochloroethylene resinous copolymer film to the underlying base. For example, I have obtained unusually satisfactory results by using as the solvent medium for the lacquer a mixture of from 85 to 96% by weight of a material which is substantially a non-solvent for the resin or rubber components of the base and a good solvent for the vinyl chloride-trifluorochloroethylene copolymer, an example of such a material being toluol, and from 15 to 4% of material which is a powerful solvent for at least one of the resin and rubber components of the base and a good solvent for the vinyl chloride-trifluorochloroethylene copolymer, an example of the latter material being a saturated aliphatic ketone such as methyl ethyl ketone or methyl isobutyl ketone. The indicated proportion of the solvent for the base materials is great enough to cause the coating composition to attack the base and give good adhesion but not so great as to cause softening of the surface of the base.

It should be pointed out that the use of an active solvent which will attack the base as a component of the lacquer solvent is not essential. I have obtained very good results using a lacquer which does not contain such an active solvent.

In the typical practice of my invention, I make up a lacquer comprising the vinyl chloride-trifluorochloroethylene resinous copolymer, pigment (if used), and mixed solvent and apply this to the surface of the previously formed body of the resin-rubber blend. Any suitable coating method such as spraying, brushing, doctoring (knife coating), squeegeeing or the like can be used, it being understood that the lacquer should be formulated with reference to the coating method to be used. In the case of flat sheets of resin-rubber mixture, the lacquer could conceivably be applied by doctoring or roller coating (as with a lambs wool roller coater) or similar methods commonly used for applying lacquers to flat materials. If desired, the lacquer composition can be applied to the resin-rubber sheet as the latter comes from the calender by which it was formed. Application (as by roller coating) of the lacquer at the calender which forms the rubber-resin sheet is often advantageous in that it enables the coated sheet thus obtained to be used as a top color sheet when plying up several layers of rubber-resin sheet under heat and pressure to form thicker sections. Application of the lacquer at the calendar enables a substantial reduction in cost as compared to pigmenting the entire rubber-resin mixture and enables the number of differently colored rubber-resin mixtures to be reduced to a few basic colors. It also avoids the serious problem of color "drift" (i. e., color change) normally encountered with high temperature mixing of the rubber and resin since the colors applied in the lacquer coating are not exposed to prolonged heat.

The concentration of the vinyl chloride-trifluorochloroethylene resinous copolymer in the lacquer will usually be equal to from 5 to 15% by weight. When a pigmented lacquer is used, the concentration of pigment in the lacquer should be sufficiently great to completely mask the surface of the underlying body. It will often be found preferable to use a weight concentration of pigment somewhat less than the resin concentration. Typically the pigment concentration will range from 5 to 13% by weight of the lacquer. I prefer to measure the relative proportions of pigment and resin by volume, as is explained in detail below.

The solids content of the lacquer will depend upon the method of coating used but will usually range from 10 to 25% by weight.

As has been indicated, the lacquer can be clear or pigmented. Those skilled in the art can readily determine whether a clear or a pigmented coating should be applied and the quantity, quality and type of pigment which should be used in pigmented lacquers in the light of the following considerations. Although the vinyl chloride-trifluorochloroethylene resinous copolymer is itself stable to any color change on exposure to ultraviolet light, a slight yellow tint, caused by its refractive index, is apparent in a clear coating over white rubber-resin blends. Therefore for the production of white or pastel shades it is highly preferred to pigment the lacquer coating with titanium dioxide or with titanium dioxide and the desired colored pigments, respectively. The effectiveness of clear coatings is influenced by the color pigments in the rubber-resin base, varying with the quantity, quality and type of such pigments. Clear coatings will not adequately protect rubber-resin blends of low (2.5 to 3.0 parts per 100 parts of rubber plus resin) pigment concentration from discoloring but effectively protects rubber-resin blends of high pigment concentration which ordinarily discolor from outdoor ultraviolet aging though not as rapidly as blends of low pigment concentration. When clear lacquers are used, the pigment concentration in the rubber-resin blend should be high (3.5 or more parts per 100 parts of rubber plus resin). The pigments used in the rubber-resin blend should be heat-stable to withstand the heat of mixing, shaping and embossing.

The vinyl chloride-trifluorochloroethylene resinous copolymer is completely stable and non-reactive to color pigments. I prefer to make the pigmented lacquers by grinding the resinous copolymer, solvent and color pigment together in a paint or ball mill. Examples of suitable pigments are cadmium pigments (other than cadmium yellow), carbon blacks, titanium dioxide, iron pigments in all shades and chrome green. The same pigments can be used in the rubber-resin blends in the case where a clear protective lacquer is used.

The amount of pigment that can be added to the vinyl chloride-trifluorochloroethylene resinous copolymer can vary widely depending upon the color intensity of the pigment used and the amount of gloss desired in the finish coat. It is most convenient to use a volume ratio in specifying the amount of pigment used relative to the amount of vinyl chloride-trifluorochloroethylene resinous copolymer. Generally speaking, volume ratios of pigment to resinous copolymer of from 0.15:1 to 0.4:1 are satisfactory. These pigment ratios are for any type of filler material and are not confined strictly to color pigments. With pigments of high color strength a ratio of 0.16:1 gives optimum gloss and color, and with increasing ratio loss of gloss and resistance to water spotting and cleaning results. With pigments of low color strength higher ratios give optimum results.

The vinyl chloride-trifluorochloroethylene resinous copolymer is soluble in all of the common ketone, aromatic hydrocarbon and chlorinated solvents commonly used in making lacquers. The type of solvent blend used will determine the spraying characteristics. The following solvent blend has been found to produce fast-drying, non-sagging coatings with good flow-out properties and with good adhesion to the surface of the rubber-resin blend without inducing permanent softening which would be objectionable:

| | Parts |
|---|---|
| Methyl isobutyl ketone | 12.0 |
| Butyl acetate | 18.0 |
| Xylene | 43.0 |
| Toluene | 27.0 |
| | 100.0 |

The addition of a small amount, say 0.1% by weight based on the vinyl chloride copolymer, of a silicone fluid (e. g., that sold as "DC–200 silicone fluid") in formulating the lacquer helps "flow-out" particularly if silicone oil be present on the surface of the rubber-resin blend.

If the rubber-resin surface is contaminated with foreign material, such as oils, wax, lint, etc. as a result of preceding operations, it is essential that it be washed with a suitable material such as isopropyl alcohol prior to spray application of my lacquer. When my lacquer is applied by brushing, squeegeeing, knife coating, roller coating, or the like, such preliminary washing is unnecessary.

A high percentage of ketones in the solvent mixture should be avoided particularly where the lacquer is applied by a method involving relative movement of surface and application such as brushing, squeegeeing, knife coating, etc., in order to avoid permanently softening the surface of the rubber-resin mixture. Smaller concentrations of ketones are desirable in that they increase the bite or adhesion of the lacquer to the smooth rubber-resin surface.

If a dull lacquer is desired it may be produced by incorporation of zinc stearate in the lacquer. Twenty parts of zinc stearate by weight based on the weight of the vinyl chloride-trifluorochloroethylene copolymer gives excellent results. The amount may vary from 10 to 25 parts. For good dispersion the zinc stearate is dissolved in the aromatic hydrocarbon portion of the solvent and the resulting solution is then uniformly incorporated with the other ingredients, namely the resin and balance of solvent and pigment (if used). If pigment is used the entire lacquer is preferably ground before use.

It is difficult to state exactly the thickness of the protective and decorative layer applied in accordance with my invention. The thickness will vary with the mode of application. The thickness of the layer will usually be equal to at least 1.0 mil and it may range upwardly from this value to 50 mils. The thickness of the layer will be thin relative to the thickness of the underlying resin-rubber body. Generally speaking, the thickness will correspond to an application of from ½ to 2 ounces of vinyl chloride-trifluorochloroethylene copolymer per square yard of base surface. Levels equal to one ounce per square yard of dry pigmented lacquer or two-thirds of an ounce per square yard of dry, clear lacquer are recommended. It will be understood that in the case of sheet material one or both faces may be provided with my coating and that in the case of a drawn or molded article the entire surface thereof or only the portion which is most exposed to weathering may be coated with the lacquer.

The details of the manufacture of the resin-rubber body to be protected need not be set forth because they are fuly described in the prior art. It will usually consist essentially of the resin and rubber, and pigment (if it is pigmented). The amount of pigment will usually not exceed 10% by weight based on the sum of resin and rubber.

The vinyl chloride-trifluorochloroethylene resinous copolymer is a material well known to those skilled in the art. It can be made in a manner generally similar to that shown in the abstract of abandoned United States application Serial No. 194,023, filed November 3, 1950, published in the Official Gazette for February 17, 1953, on pages 765–766. Almost invariably it will contain from 5 to 95% of vinyl chloride and from 95 to 5% of trifluorochloroethylene and more commonly from 30 to 95% of vinyl chloride and from 70 to 5% of trifluorochloroethylene. These copolymers can be made by emulsion polymerization using a water-soluble free radical polymerization catalyst and preferably with incremental addition of vinyl chloride. An example of such a resin is that sold commercially as "Exon 400 XR–61" made by Firestone Plastics Company, a division of Firestone Tire and Rubber Co. "Exon 400 XR–61" resin is supplied in a white powder form which can be easily dissolved in the solvent mixture to form the lacquer. "Exon 400 XR–61" was found by analysis to contain 60% vinyl chloride and 40% trifluorochloroethylene. The vinyl chloride-trifluorochloroethylene resinous copolymers are thermoplastic and are readily soluble in the usual aromatic hydrocarbon and ketone solvents. Their good solubility allows formulation in a solvent system which in addition to attacking the underlying resin-rubber body as mentioned above, meets the customary coating requirements and drying schedules. The applied lacquer coating does not require baking at a temperature sufficiently high to fuse the resinous copolymer. The lacquer dries rapidly to a tack-free surface in 20 minutes at room temperature. Full hardness is reached after overnight drying. Circulating hot air at 150° F. may be used to accelerate drying without blisters forming in the coating.

The physicial properties of "Exon 400 XR–61" are as follows:

| | |
|---|---|
| Specific gravity | 1.74–.78. |
| Relative viscosity (average) (1% solution in cyclohexanone) | 1.5. |
| Rockwell hardness | R75 to R85. |
| Cold crack temperature, ° C | 24 to 20. |
| Outdoor and indoor aging | Excellent. |
| Dielectric constant (75° F.—60 cycles) | 2.84. |
| D. C. resistivity (158° F.—60 cycles, ohm/cm.) | $5 \times 10^{14}$. |

The binding or film-forming component of the protective and decorative layer of my invention can consist of the resinous vinyl chloride-trifluorochloroethylene copolymer. Alternatively, other binding or film-forming components compatible with the resinous copolymer may be used therewith in proportions ranging from a very minor proportion up to a proportion equal to that of the resinous copolymer. Examples of such other materials are alkyd or polyester resins, resinous acrylic acid ester polymers (e. g., polymethyl acrylate, polyethyl acrylate, etc.), and silicone resins. The use of the resinous acrylic acid ester polymers is highly advantageous because it improves grease-resistance without reducing water-resistance or outside weathering properties.

In the typical practice of my invention, the underlying body will be manufactured in about 10 basic colors and around 100 differently colored lacquer formulations will be provided, these roughly matching the ten basic colors and giving the necessary variety of colors required in the finished article. Thus the manufacture of the underlying body is greatly simplified and the number of rubber-resin stocks required to be processed is greatly reduced with consequent large savings in the inventory and in scrap.

Two-tone effects can be achieved, in the practice of my invention, by applying a pigmented lacquer over a suitably embossed appropriately pigmented rubber-resin base and applying a clear protective over the entire surface. Thus a brown lacquer coat may be squeegee-coated over a light tan basket weave embossed rubber-resin surface and a protective clear lacquer coat sprayed over the entire surface.

Any of the conventional forming methods can be used with sheet rubber-resin blend protected by means of my coating. Vacuum forming is somewhat preferable to plug drawing because with vacuum forming the lacquer coating does not have to withstand the hot shear stress encountered with plug drawing.

The vinyl chloride-trifluorochloroethylene layer of my invention stands up very well on exposure to the elements. Thus, resin-rubber panels lacquered in accordance with my invention and exposed to the Florida sun for 12 months have shown very little deterioration in appearance whereas uncoated panels of the same blend showed very objectionable impairment in appearance when exposed under the same conditions. The coating of my invention protects the surface of the rubber-resin blend against bloom, surface erosion, water spotting and discoloration upon exposure to the elements over long periods of time.

One of the most significant advantages of the use of vinyl chloride-trifluorochloroethylene resinous copolymer is that coatings containing it adhere unusually well to the underlying resin-rubber body even after long exposure to the weather. To the best of my knowledge no other available coating material approaches the vinyl chloride-trifluorochloroethylene copolymer in this respect. I have tried many other materials but none of them has proved at all successful for this use.

An advantage of using vinyl chloride-trifluorochloroethylene resinous copolymer as the sole film-forming or binding component of the protective layer is that the resulting layer is fireproof.

The vinyl chloride-trifluorochloroethylene copolymer is thermoplastic and therefore the lacquered rubber-resin sheet can be deep drawn into shapes without any cracking or impairment of the coating. The lacquer coating is fully compatible with the rubber-resin blend and this makes it possible to re-work all process scrap.

In the drawing, reference numeral 1 denotes the underlying resin-rubber body and reference numeral 2 denotes the deposited pigmented layer of the vinyl chloride-trifluorochloroethylene resinous copolymer.

*Example*

A lacquer having the following composition was prepared:

| | Parts by weight |
|---|---|
| "Exon 400 XR-61" | 200 |
| Aztec red (pigment) | 150 |
| Toluol | 1600 |
| Methyl ethyl ketone | 100 |

This lacquer was sprayed onto the surface of a normally hard, tough, thermoplastic base sheet formed of a mixture of 70 parts of a resinous copolymer of styrene and acrylonitrile containing 27–28% acrylonitrile and 30 parts of a butadiene-acrylonitrile rubbery copolymer containing about 62% of methyl ethyl ketone-insoluble gel and containing about 30% combined acrylonitrile, together with small amounts of pigment. Upon removing the lacquer solvent by evaporation, there was obtained an article which upon prolonged weathering did not exhibit visible phase separation. Some phase separation in the underlying body may have occurred but it could not be seen through the coating. The lacquer coating did not chip from the underlying body and retained its attractive appearance over a long period of weathering.

Blends of styrene-acrylonitrile resinous copolymer and butadiene-acrylonitrile rubbery copolymer coated with a pigmented lacquer of my invention at a level of one ounce of solids per square yard have exhibited substantially no discoloration or water spotting after 500 hours in a standard "weatherometer," indicating the outstanding value of my coating for outdoor applications. The lacquer prevents surface "erosion" and "bloom" which have been serious problems in these blends. Surface erosion is actually a phase separation of the rubber and resin which changes the refractive index of the surface. This phase separation is experienced when the rubber-resin blend is bent cold, or given a sharp impact, or exposed to outdoor weathering. The intimate adhesion of my lacquer coating to the rubber-resin blend appears to be responsible for the prevention of the appearance of phase separation. "Bloom" apparently is produced from a migration of certain incompatible ingredients in the resin-rubber blend to the surface and in some manner is prevented from appearing by my coating.

An accelerated test for determining the rate of development of surface erosion on the surface of the blends of styrene-acrylonitrile resinous copolymers and butadiene-acrylonitrile rubbery copolymers involves the partial immersion of strips of the sheeted rubber-resin blend in distilled water at 170° F. for 5 hours. The uncoated blends turn white in less than 1 hour immersion while the strips which have been coated in accordance with my invention will resist marked change upon immersion for better than 5 hours.

Adhesion of the coating of my invention to rubber-resin blends has been tested by scratching two crossed lines through the coating and, after 5 hours' immersion in water at 170° F., examining as to the extent to which whitening has progressed from the scratch lines. Adhesion is then determined after the 5 hour water test by applying "Scotch" pressure-sensitive adhesive tape across the lines of the samples. The tape is then removed with a quick jerk and any failure of the lacquer bond is considered a failure of the coating. The same test can be used to determine dry (i. e. without water immersion) adhesion of the lacquer to the rubber-resin blend. Under these tests, my coating exhibits remarkable adhesion.

Except where otherwise noted, all proportions and percentages given herein are by weight.

Having thus described my invention, what I claim and desire to protect by Letters Patent is:

1. A new article of manufacture comprising a normally hard, tough, thermoplastic body composed of a uniform thermoplastic mixture selected from the group consisting of mixtures of from 60 to 90% of a resinous copolymer of styrene and acrylonitrile, in proportions of from 50 to 90% of styrene and from 50 to 10% of acrylonitrile, and from 40 to 10% of a rubbery copolymer of butadiene and acrylonitrile, and mixtures of from 60 to 90% of a resinous copolymer of styrene and butadiene, in proportions of from 75 to 95% of styrene and from 25 to 5% of butadiene, and from 40 to 10% of a rubbery copolymer of butadiene and styrene, and on the surface of said body a relatively thin continuous layer of resinous copolymer consisting essentially of 5 to 95% vinyl chloride and from 95 to 5% trifluorochloroethylene.

2. An article of manufacture as set forth in claim 1 wherein said layer is pigmented.

3. An article of manufacture as set forth in claim 1 wherein said layer is pigmented, the volume ratio of pigment to said last-named resinous copolymer being equal to from 0.15:1 to 0.4:1.

4. The method which comprises applying to the surface of a normally hard, tough, thermoplastic body composed of a uniform thermoplastic mixture selected from the group consisting of mixtures of from 60 to 90% of a resinous copolymer of styrene and acrylonitrile, in proportions of from 50 to 90% of styrene and from 50 to 10% of acrylonitrile, and from 40 to 10% of a rubbery copolymer of butadiene and acrylonitrile, and mixtures of from 60 to 90% of a resinous copolymer of styrene and butadiene, in proportions of from 75 to 95% of styrene and from 25 to 5% of butadiene, and from 40 to 10% of a rubbery copolymer of butadiene and styrene, a relatively thin continuous layer comprising a resinous copolymer consisting essentially of from 30 to 95% vinyl chloride and from 70 to 5% trifluorochloroethylene dissolved in a volatile organic solvent for the last-named resinous copolymer, and evaporating said solvent to form a thin continuous layer of a resinous copolymer of vinyl chloride and trifluorochloroethylene tenaciously adhered to the surface of said body.

5. The method of claim 4 wherein said layer is pigmented.

6. The method of claim 4 wherein said layer is pigmented, the volume ratio of pigment to said last-named resinous copolymer being equal to from 0.15:1 to 0.4:1.

7. The method which comprises applying to the surface of a normally hard, tough, thermoplastic body composed of a uniform thermoplastic mixture of from 60 to 90% of a resinous copolymer of styrene and acrylonitrile, in proportions of from 50 to 90% of styrene and from 50 to 10% of acrylonitrile, and from 40 to 10% of a rubbery copolymer of butadiene and acrylonitrile, a relatively thin continuous layer of a lacquer comprising pigment and a resinous copolymer consisting essentially of from 30 to 95% vinyl chloride and from 70 to 5% trifluorochloroethylene dissolved in a volatile organic solvent for the last-named resinous copolymer, and evaporating said solvent to form a thin continuous layer of pigmented resinous copolymer of vinyl chloride and trifluorochloroethylene adhered to the surface of said body.

8. The method which comprises applying to the surface of a normally hard, tough, thermoplastic body composed of a uniform thermoplastic mixture selected from the group consisting of mixtures of from 60 to 90% of a resinous copolymer of styrene and acrylonitrile, in proportions of from 50 to 90% of styrene and from 50 to 10% of acrylonitrile, and from 40 to 10% of a rubbery copolymer of butadiene and acrylonitrile, and mixtures of from 60 to 90% of a resinous copolymer of styrene and butadiene, in proportions of from 75 to 95% of styrene and from 25 to 5% of butadiene, and from 40 to 10% of a rubbery copolymer of butadiene and styrene, a relatively thin continuous layer comprising pigment and a resinous copolymer consisting essentially of from 5 to 95% vinyl chloride and from 95 to 5% trifluorochloroethylene dissolved in a volatile organic solvent for the last-named resinous copolymer, said solvent composed of a mixture of two organic liquids, one of which is substantially a non-solvent for the rubbery and resinous components of said body, the other of which is a solvent for said rubber and resin components of said body, and evaporating said solvent to form a thin continuous layer of pigmented resinous copolymer of vinyl chloride and trifluorochloroethylene tenaciously adhered to the surface of said body.

9. The method of claim 4 wherein said solvent is composed of from 85 to 96% of an organic liquid which is substantially a non-solvent for the components of said mixture and correspondingly from 15 to 4% of a saturated aliphatic ketone.

References Cited in the file of this patent

UNITED STATES PATENTS

| | | |
|---|---|---|
| 2,479,367 | Joyce et al. | Aug. 16, 1949 |
| 2,550,139 | Daly | Apr. 24, 1951 |
| 2,705,691 | Panagrossi et al. | Apr. 5, 1955 |